(12) United States Patent
Kim et al.

(10) Patent No.: US 7,450,849 B2
(45) Date of Patent: Nov. 11, 2008

(54) WAVELENGTH-DIVISION MULTIPLEXING PASSIVE OPTICAL NETWORK

(75) Inventors: Sang-Ho Kim, Seoul (KR); Chang-Sup Shim, Seoul (KR); Yun-Je Oh, Yongin-si (KR); Seong-Taek Hwang, Pyeongtaek-si (KR)

(73) Assignee: Samsung Electronics Co., Ltd., Yeongtong-Gu, Sawon-Si, Gyeonggi-Do (KR)

( * ) Notice: Subject to any disclaimer, the term of this patent is extended or adjusted under 35 U.S.C. 154(b) by 504 days.

(21) Appl. No.: 11/197,176

(22) Filed: Aug. 4, 2005

(65) Prior Publication Data
US 2006/0115270 A1    Jun. 1, 2006

(30) Foreign Application Priority Data
Dec. 1, 2004    (KR) .................... 10-2004-0099919

(51) Int. Cl.
*H04J 14/00* (2006.01)
(52) U.S. Cl. .................................................. 398/72
(58) Field of Classification Search ............. 398/43, 398/48, 58, 68–72, 79, 95
See application file for complete search history.

(56) References Cited
U.S. PATENT DOCUMENTS
5,559,624 A * 9/1996 Darcie et al. ............... 398/72
5,790,293 A * 8/1998 Frigo ......................... 398/33
2005/0129402 A1* 6/2005 Kim et al. ................... 398/79
2005/0147412 A1* 7/2005 Park et al. ................... 398/72

* cited by examiner

*Primary Examiner*—Kenneth Vanderpuye
*Assistant Examiner*—Cody W Lamb
(74) *Attorney, Agent, or Firm*—Cha & Reiter, LLC

(57) ABSTRACT

A wavelength-division multiplexing passive optical network (WDM-PON) comprising a central office for generating monitor light and multiplexed downstream optical signals to be out and detecting upstream optical signals, the central office including a signal monitoring unit monitoring based on fed-back monitor light if the wavelengths of the upstream optical signals and the wavelengths of the downstream optical signals change, a plurality of subscriber units for detecting corresponding downstream optical signals and generating upstream optical signals, a remote node for reflecting the monitor light to the central office, de-multiplexing multiplexed downstream optical signals so as to output the downstream optical signals to the corresponding subscriber units, and multiplexing the upstream optical signals so as to output the upstream optical signals to the central office, a first optical path for linking the central office to the remote node, and a plurality of second optical paths for linking the remote node to the subscriber units, respectively.

11 Claims, 2 Drawing Sheets

WAVELENGTH-DIVISION MULTIPLEXING PASSIVE OPTICAL NETWORK

CLAIM OF PRIORITY

This application claims priority to an application entitled "Wavelength-Division Multiplexing passive Optical Network," filed in the Korean Intellectual Property Office on Dec. 1, 2004 and assigned Serial No. 2004-99919, the contents of which are incorporated herein by reference.

BACKGROUND OF THE INVENTION

1. Field of the Invention

The present invention relates to a wavelength-division multiplexing passive optical network, and more particularly to a passive optical network including a signal monitoring unit for compensating an optical signal when a wavelength band of the optical signal changes.

2. Description of the Related Art

A wavelength-division multiplexing (WDM) scheme, which is adaptable for a passive optical network (PON), assigns each subscriber unit with an intrinsic wavelength. The PON includes a central office for generating a plurality of downstream optical signals provided to subscriber units and detecting upstream optical signals, a plurality of subscriber units for detecting downstream optical signals and generating upstream optical signals, and a remote node for relaying optical signals between the central office and the subscriber units.

The PON usually has a typical double star-type network structure in which the central office is linked to the remote node through a single optical path, and the subscriber units are linked to the remote node. Further, the PON includes a plurality of optical devices. In particular, the optical paths for linking the central office with the remote node and for linking the remote node with the subscriber units are constructed using optical fiber including silica. Typical optical devices have refractive indices varied depending on the change of a temperature, and these varied refractive indices are a factor of changing wavelength bands of downstream and upstream optical signals transmitted through corresponding optical devices.

The change of wavelength bands of downstream and upstream optical signals as described above deteriorates an optical signal receiving efficiency in the central office or each subscriber unit receiving the optical signals. In addition, the change of the wavelength bands may cause a variety of erroneous operations of a system. For example, the change of the wavelength bands may make it difficult to detect the received state of the downstream and upstream optical signals.

In order to solve the problems described above, a variety of methods and apparatus for monitoring the change of wavelength bands of optical signals according to the change of a temperature and compensating the optical signals have been suggested.

In U.S. Pat. Registration No. 6,304,350 ("Temperature compensated multi-channel, wavelength-division multiplexing passive optical network" issued by Doerr), a wavelength-division multiplexer/de-multiplexer must include additional ports for monitor light. In Doerr, the monitor light is transmitted/received through an optical path, and the wavelength bands of optical signals are monitored based on the degree of change in the intensity of the monitor light.

Thus, the conventional PON must assign additional ports to a multiplexer/de-multiplexer in order to monitor the wavelength change of optical signals. This degrades the communication efficiency of the PON and makes it difficult to maintain the PON.

SUMMARY OF THE INVENTION

Accordingly, the present invention has been made to solve the above-mentioned problems occurring in the prior art and provides additional advantages, by providing a passive optical network including a signal monitoring unit capable of easily monitoring the change of wavelength bands of optical signals transmitted in the passive optical network and maintaining an initial transmission state of the passive optical network.

In one embodiment, there is provided a wavelength-division multiplexing passive optical network (WDM-PON) including a central office for generating monitor light and multiplexed downstream optical signals to be output and detecting upstream optical signals, the central office including a signal monitoring unit monitoring based on fed-back monitor light if the wavelengths of the upstream optical signals and the wavelengths of the downstream optical signals change, a plurality of subscriber units for detecting corresponding downstream optical signals and generating upstream optical signals, a remote node for reflecting the monitor light to the central office, de-multiplexing multiplexed downstream optical signals so as to output the downstream optical signals to the corresponding subscriber units, and multiplexing the upstream optical signals so as to output the upstream optical signals to the central office, a first optical path for linking the central office to the remote node, and a plurality of second optical paths for linking the remote node to the subscriber units, respectively.

BRIEF DESCRIPTION OF THE DRAWINGS

The above features and advantages of the present invention will be more apparent from the following detailed description taken in conjunction with the accompanying drawings, in which.

DETAILED DESCRIPTION

Hereinafter, embodiments of the present invention will be described in detail with reference to the accompanying drawings. For the purposes of clarity and simplicity, a detailed description of known functions and configurations incorporated herein will be omitted as it may make the subject matter of the present invention unclear.

Figure 1:
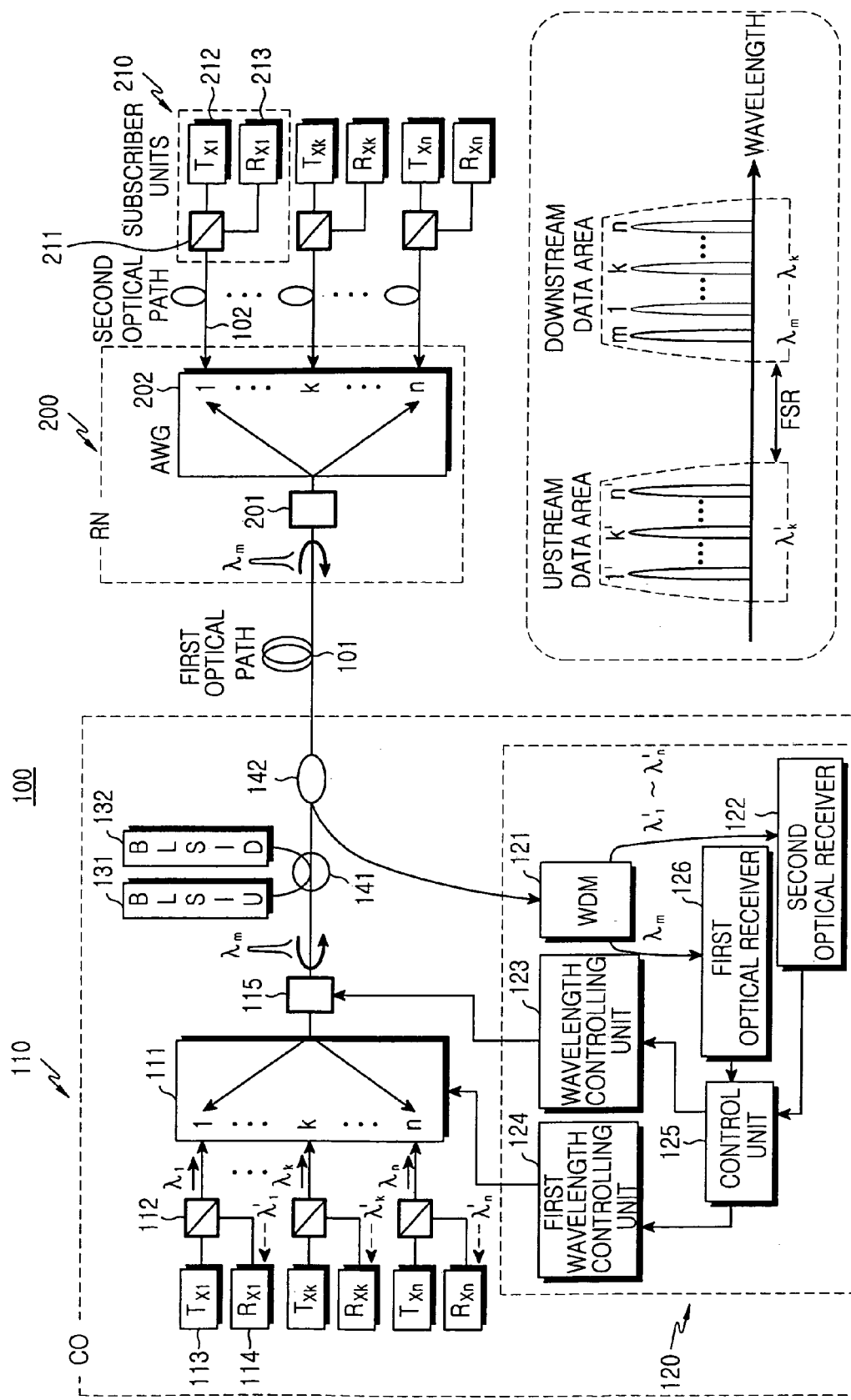
FIG. 1 is a block diagram illustrating a structure of a passive optical network including a signal monitoring unit according to a first embodiment of the present invention.

FIG. 1 is a block diagram illustrating a structure of a passive optical network (PON) 100 according to a first embodiment of the present invention. As shown, the PON 100 includes a central office 110 for generating multiplexed downstream optical signals, a plurality of subscriber units 210 for generating wavelength-locked upstream optical signals, a remote node 200 positioned between the central office 110 and the subscriber units 210, a first optical path 101, and second optical paths 102.

The first optical path 101 links the central office 110 with the remote node 200, and the second optical paths 102 link the corresponding subscriber units 210 with the remote node 200. The first optical path 101 and the second optical paths may include optical fibers.

The central office 110 includes a plurality of downstream light sources (Tx1~Txn) 113 for generating wavelength-locked downstream optical signals, a first multiplexer/de-multiplexer 111 for de-multiplexing multiplexed upstream optical signals, a plurality of upstream optical detectors 114 (Rx1~Rxn) for detecting de-multiplexed upstream optical signals, a broadband light source-up 131 and a broadband light source-down 132, a signal monitoring unit 120, a first optical splitter 141 and a second optical splitter 142, and a first wavelength selection reflection filter 115.

The broadband light source-down 132 generates downstream light having a broad wavelength band for performing wavelength locking with respect to each of the downstream light sources 113. The broadband light source-up 131 generates upstream light for performing wavelength locking with respect to each of subscriber units 210. In other words, the upstream light and the downstream light have wavelength bands spaced from each other with a preset free spectral range.

The first wavelength selection reflection filter 115 positioned on the first optical path 101 reflects wavelength-locked light (having a wavelength of $\lambda_m$) to the remote node 200. The first wavelength selection reflection filter 115 allows the downstream optical signal (having a wavelength of $\lambda_k$) and the upstream optical signal (having a wavelength of $\lambda_{k'}$) to pass through the first multiplexer/de-multiplexer 111. The first wavelength selection reflection filter 115 outputs the multiplexed downstream optical signals (having a wavelength of $\lambda_k$) output from the first multiplexer/de-multiplexer 111 to the remote node 200 through the first optical path 101.

The first optical splitter 141 positioned on the first optical path 101 is linked with both the broadband light source-up 131 and the broadband light source-down 132, thereby outputting the downstream light to the first wavelength selection reflection filter 115 and outputting the upstream light to the remote node 200 through the first optical path 101.

The first multiplexer/de-multiplexer 111 divides the downstream light into a plurality of downstream channels with their own wavelengths to be output to corresponding downstream light sources 113. The downstream light sources 113 generate downstream optical signals locked by the corresponding downstream channels so as to output the locked downstream optical signals to the first multiplexer/de-multiplexer 111. The first multiplexer/de-multiplexer 111 multiplexes the downstream optical signals and outputs the multiplexed downstream optical signals to the remote node 200 through the first optical path 101.

In addition, the first multiplexer/de-multiplexer 111 de-multiplexes the upstream optical signals multiplexed in the remote node 200 and outputs the de-multiplexed upstream optical signals to the optical detectors 114.

The second optical splitter 142 positioned between the first optical splitter 141 and the remote node 200 allows monitor light reflected from the first wavelength selection reflection filter 115 to pass through the remote node 200 and outputs monitor light reflected from the remote node 200 to the signal monitoring unit 120.

The signal monitoring unit 120 includes a wavelength-division multiplexer 121, a first optical receiver 126, a second optical receiver 122, a control unit 125, a first wavelength controlling unit 124, and a second wavelength controlling unit 123.

The wavelength-division multiplexer 121 divides multiplexed upstream optical signals and the monitor light received from the second optical splitter 142 according to corresponding paths, thereby outputting the monitor light to the first optical receiver 126 and outputting the multiplexed upstream optical signals to the second optical receiver 122.

The first optical receiver 126 converts the monitor light into a first electrical signal to be output to the control unit 125. The second optical receiver 122 converts the upstream optical signal into a second electrical signal to be output to the control unit 125.

The control unit 125 determines if the first optical path 101 and the second optical path 102 are abnormal based on the received state and the intensity change of the first and second electrical signals so as to generate control signals used for compensating the first and second electrical signals. In addition, the control unit 125 may compare the intensities of the first and second electrical signals with a preset reference value, monitor the wavelength change of the monitor light based on the intensity change of the first and second electrical signals, and generate the control signals used for controlling the first wavelength controlling unit 124 and the second wavelength controlling unit 123.

The first wavelength controlling unit 124 controls the first multiplexer/de-multiplexer 111 according to the control signal described above. The second wavelength controlling unit 123 controls the first wavelength selection reflection filter 115 according to the control signal described above.

The remote node 200 includes a second wavelength selection reflection filter 201 and a second multiplexer/de-multiplexer 202, thereby de-multiplexing multiplexed downstream optical signals to be output to corresponding subscriber units 210 and multiplexing upstream optical signals input from the subscriber units 210 so as to output the multiplexed upstream optical signals to the central office 110. The second multiplexer/de-multiplexer 202 divides upstream light into a plurality of upstream channels to be output to the corresponding subscriber units 210.

The second wavelength selection reflection filter 201 is positioned between the second optical splitter 142 and the second multiplexer/de-multiplexer 202.

The second wavelength selection reflection filter 201 allows the upstream light and the multiplexed downstream optical signals received from the central office 110 to pass through the second multiplexer/de-multiplexer 202. In addition, the second wavelength selection reflection filter 201 allows the upstream optical signals multiplexed in the second multiplexer/de-multiplexer 202 to pass through the central office 110. The second wavelength selection reflection filter 201 allows the upstream light received from the central office 110 to pass through the second multiplexer/de-multiplexer 202.

In the meantime, the second wavelength selection reflection filter 201 reflects the monitor light to the central office 110. In other words, the second wavelength selection reflection filter 201 may employ a bandpass filter capable of transmitting light having some specific wavelength bands and reflecting light having other specific wavelength bands.

Each of the subscriber units 210 includes a downstream optical detector 213 (Rx1~Rxn) for detecting a corresponding downstream optical signal, an upstream light source 212 (Tx1~Txn) for generating an upstream optical signal wavelength-locked by a corresponding wavelength from among wavelengths of the upstream light de-multiplexed in the remote node 200, and a second wavelength selection coupler 211 coupled with the remote node 200, the downstream optical detector 213, the upstream light source 212.

The downstream optical detector 213 may include a photo diode, and the upstream light source 212 may include a Fabry-Perot laser or a semiconductor optical amplifier.

The second wavelength selection coupler 211 including a plurality of ports is coupled with the remote node 200, the downstream optical detector 213, and the upstream light source 212 through corresponding ports. The second wavelength selection coupler 211 outputs a de-multiplexed downstream optical signal received through the corresponding second optical path 102 to the downstream optical detector 213 and outputs upstream light having a corresponding wavelength from among wavelengths of the upstream light de-multiplexed in the remote node 200 to the upstream light source 212. The upstream light source 212 generates an upstream optical signal wavelength-locked by upstream light having a corresponding wavelength so as to output the upstream optical signal to the second wavelength selection coupler 211. The second wavelength selection coupler 211 outputs the wavelength-locked upstream optical signal to the remote node 200 through the second optical path 102. The monitor light may be generated by using partial wavelengths unused for generating wavelength-locked downstream optical signals from among wavelengths of downstream light generated from the broadband light source-down.

Figure 2:
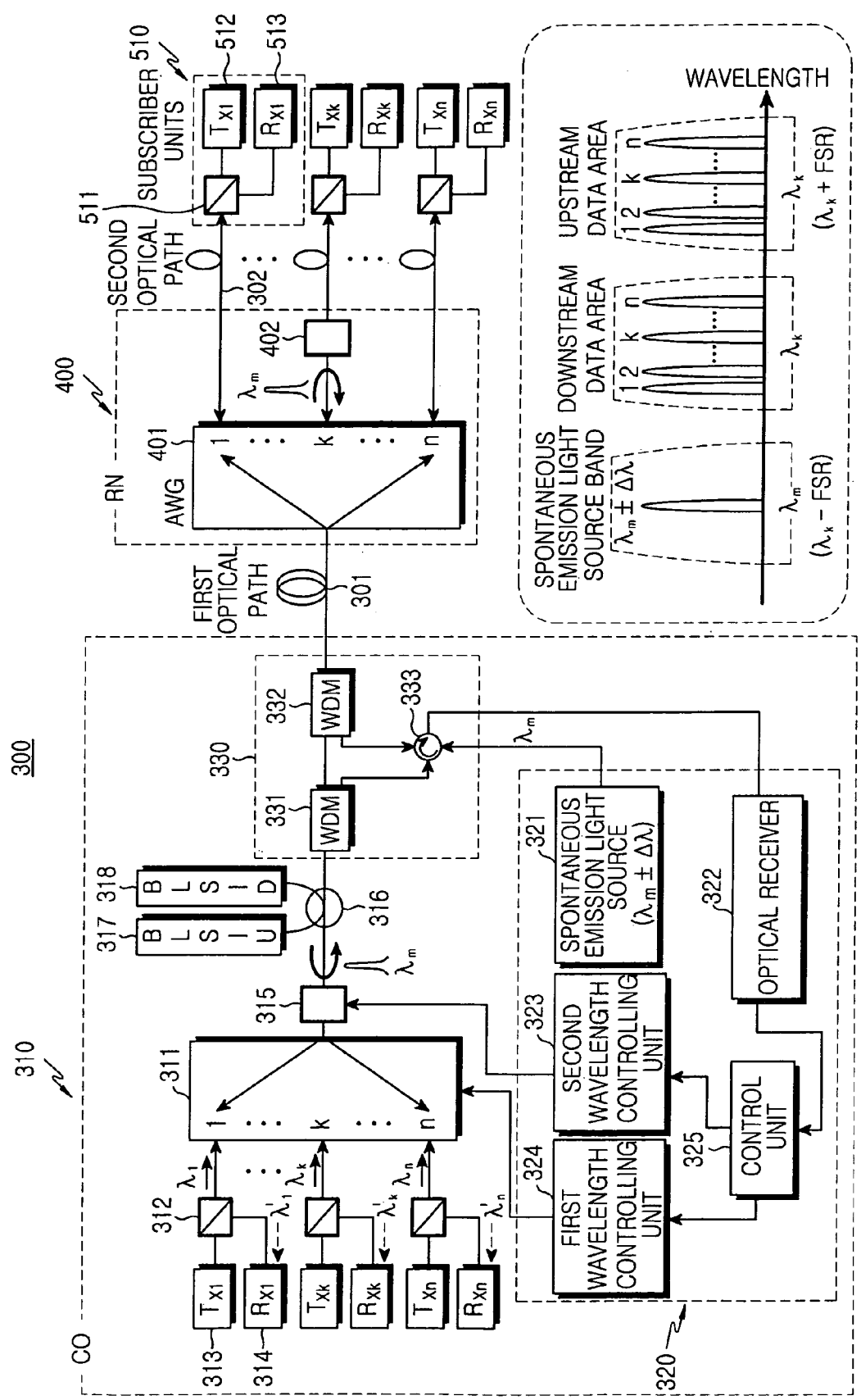
FIG. 2 is a block diagram illustrating a structure of a passive optical network including a signal monitoring unit according to a second embodiment of the present invention.

FIG. 2 is a block diagram illustrating a structure of a passive optical network (PON) 300 including a signal monitoring unit according to a second embodiment of the present invention. As shown, the PON 300 includes a central office 310 for generating multiplexed downstream optical signals, a plurality of subscriber units 510 for generating wavelength-locked upstream optical signals, a remote node 400 positioned between the central office 310 and the subscriber units 510, a first optical path 301, and second optical paths 302.

The central office 310 includes a broadband light source-down 318 and a broadband light source-up 317, a plurality of downstream light sources 313 (Tx1~Txn), a plurality of upstream optical detectors 314 (Rx1~Rxn), a first multiplexer/de-multiplexer 311, a signal monitoring unit 320, a first wavelength selection reflection filter 315, an optical signal circulating unit 330, a wavelength selection coupler 312, and an optical splitter 316.

The broadband light source-down 318 generates downstream light having a preset broad wavelength band of $\lambda_k$ ($\lambda_{k1}$~$\lambda_{kn}$). The downstream light is divided into a plurality of downstream channels ($\lambda_{k1}$~$\lambda_{kn}$) having different wavelengths in the first multiplexer/de-multiplexer 311 and then used for wavelength-locking the corresponding downstream light source 313.

The broadband light source-up 317 generates upstream light having a wavelength band of $\lambda_{k'}$ ($\lambda_{k1'}$~$\lambda_{kn'}$) different from the wavelength band of $\lambda_k$ ($\lambda_{k1}$~$\lambda_{kn}$) for the downstream light. The upstream light is divided into a plurality of upstream channels ($\lambda_{k1'}$~$\lambda_{kn'}$) having different wavelengths in the remote node 400 and then is used for wavelength-locking a corresponding subscriber unit 510.

Each of the downstream light sources 313 generates a downstream optical signal wavelength-locked by a downstream channel having a corresponding wavelength from among downstream channels of the downstream light divided in the first multiplexer/de-multiplexer 311 and outputs the downstream optical signal to the first multiplexer/de-multiplexer 311. Each of the upstream optical detectors 314 may include photo detectors such as a photo diode and detects an upstream optical signal having a corresponding wavelength de-multiplexed in the first multiplexer/de-multiplexer 311.

Each of the downstream light sources 313 and each of the upstream optical detector 314 are coupled with the first multiplexer/de-multiplexer 311 through the corresponding wavelength selection coupler 312.

The first multiplexer/de-multiplexer 311, which may include an arrayed waveguide grating, de-multiplexes the multiplexed upstream optical signals, and multiplexes the downstream light into downstream channels. In addition, the first multiplexer/de-multiplexer 311 multiplexes the downstream optical signals to be output.

The first wavelength selection reflection filter 315 is positioned between the broadband light source-up 317 coupled with the optical splitter 316 and the first multiplexer/de-multiplexer 311 and selectively reflects only monitor light having a wavelength of $\lambda_m$ to the remote node 400.

The optical splitter 316 positioned on the first optical path 301 is coupled with the broadband light source-up 317 and broadband light source-down 318, thereby outputting the downstream light to the first wavelength selection reflection filter 315 and outputting the upstream light to the remote node 400.

The optical signal circulating unit 330 includes a circulator 333 and at least two wavelength-division multiplexers 331 and 332 which are opposite to each other on the first optical path 301.

The first wavelength-division multiplexer 331 outputs multiplexed downstream optical signals to the second wavelength-division multiplexer 332 and outputs multiplexed upstream optical signals input through the second wavelength-division multiplexer 332 to the first multiplexer/de-multiplexer 311 through the optical splitter 316 and the first wavelength selection reflection filter 315.

The second wavelength-division multiplexer 332 outputs multiplexed downstream optical signals to the remote node 400 and outputs the multiplexed upstream optical signals to the first wavelength-division multiplexer 331.

The first and the second wavelength-division multiplexers 331 and 332 input/output monitor light through the circulator 333. In other words, the monitor light input to the first wavelength-division multiplexer 331 through the circulator 333 is output to the first wavelength selection reflection filter 315 through the optical splitter 316. The monitor light reflected from the first wavelength selection reflection filter 315 is output to the second wavelength-division multiplexer 332 through the circulator 333.

The second wavelength-division multiplexer 332 outputs the monitor light input from the circulator 333 to the remote node 400 and outputs the monitor light reflected from the remote node 400 to the circulator 333.

The circulator 333 couples the signal monitoring unit 320 with the first and the second wavelength-division multiplexers 331 and 332 and outputs the monitor light input through the second wavelength-division multiplexer 332 to the signal monitoring unit 320.

The signal monitoring unit 320 includes a spontaneous emission light source 321, an optical receiver 322, a control unit 325, a first wavelength controlling unit 324, and a second wavelength controlling unit 323.

The spontaneous emission light source 321 generates spontaneous emission light having a preset wavelength band ($\lambda_m \pm \Delta\lambda$), and the spontaneous emission light described above includes monitor light. The spontaneous emission light including the monitor light is output to the first wavelength selection reflection filter 315 through the optical signal circulating unit 330. The first wavelength selection reflection filter 315 reflects only the monitor light to the remote node 400.

The optical receiver 322 converts the monitor light input from the second wavelength-division multiplexer 332 into an electrical signal to be output to the control unit 325. The control unit 125 determines if the first optical path 301 and the second optical path 302 are abnormal and if the wavelengths of the upstream and the downstream optical signals based on the received state and the intensity change of the electrical signal so as to generate control signals used for compensating the electrical signal. Then, the control unit 125 outputs the generated control signals to the first wavelength controlling unit 324 and the second wavelength controlling unit 323, respectively.

The first wavelength controlling unit 324 controls the first multiplexer/de-multiplexer 311 according to the corresponding control signal generated from the control unit 325. The second wavelength controlling unit 323 controls the first wavelength selection reflection filter 315 according to the corresponding control signal generated from the control unit 325.

The remote node 400 includes a second multiplexer/de-multiplexer 401 and a second wavelength selection reflection filter 402. The second multiplexer/de-multiplexer 401 divides upstream light received from the central office 310 into a plurality of upstream channels having mutually different wavelengths to be output to the corresponding subscriber units 510. In addition, the second multiplexer/de-multiplexer 401 multiplexes the multiplexed downstream optical signals to be output to the corresponding subscriber units 510.

In addition, the second multiplexer/de-multiplexer 401 outputs monitor light received from the central office to the second wavelength selection reflection filter 402, and outputs the monitor light reflected from the second wavelength selection reflection filter 402 to the central office 310.

The second wavelength selection reflection filter 402 is positioned between the second multiplexer/de-multiplexer 401 and the corresponding subscriber unit 510 on the second optical path 302, thereby reflecting only monitor light having a corresponding wavelength to the second multiplexer/de-multiplexer 401.

Each of the subscriber units 510 includes a downstream optical detector 513 (Rx1~Rxn) for detecting a corresponding downstream optical signal, an upstream light source 512 (Tx1~Txn) for generating an upstream optical signal wavelength-locked by the corresponding upstream channel de-multiplexed in the remote node 400, and a second wavelength selection coupler 511.

The downstream optical detector 513 may include a photo diode, and the upstream light source 512 may include a Fabry-Perot laser or a semiconductor optical amplifier. The second wavelength selection coupler 511 couples the downstream optical detector 513 and the upstream light source 512 with the remote node 400 through the corresponding second optical path.

As described above, in the passive optical network according to the present invention, although some ports of a multiplexer/de-multiplexer are not assigned for monitor light used for monitoring the wavelength change of optical signals, it is possible to monitor the wavelength change of downstream and upstream optical signals and control the operation of compensating wavelengths of the optical signals based on the wavelength change of the optical signals.

While the invention has been shown and described with reference to certain preferred embodiments thereof, it will be understood by those skilled in the art that various changes in form and details may be made therein without departing from the spirit and scope of the invention. Consequently, the scope of the invention should not be limited to the embodiments, but should be defined by the appended claims and equivalents thereof.

What is claimed is:

1. A wavelength-division multiplexing passive optical network (WDM-PON) comprising:
   a central office for generating a monitor light and multiplexed downstream optical signals to be output and detecting upstream optical signals, the central office including a signal monitoring unit monitoring based on a fed-back monitor light if wavelengths of the upstream optical signals and wavelengths of the downstream optical signals change;
   a plurality of subscriber units for detecting corresponding downstream optical signals and generating upstream optical signals;
   a remote node for reflecting the monitor light to the central office, de-multiplexing multiplexed downstream optical signals so as to output the downstream optical signals to the corresponding subscriber units, and multiplexing the upstream optical signals so as to output the upstream optical signals to the central office;
   a first optical path for linking the central office with the remote node; and
   a plurality of second optical paths for linking the remote node with the subscriber units, respectively, wherein the central office comprises:
   a downstream broadband light source for generating downstream light with a broad wavelength band;
   an upstream broadband light source for generating upstream light having a wavelength band different from the wavelength band of the downstream light;
   a plurality of downstream light sources for generating downstream optical signals having wavelengths locked by the downstream light;
   a plurality of upstream optical detectors for detecting upstream optical signals;
   a first multiplexer/de-multiplexer for multiplexing the downstream optical signals to be output, de-multiplexing multiplexed upstream optical signals to be output to the corresponding upstream optical detectors, and dividing the downstream light into a plurality of downstream channels to be output to the corresponding downstream light sources;
   a first wavelength selection reflection filter for selectively reflecting the monitor light having only a preset wavelength in the downstream light, the first wavelength selection reflection filter being positioned between the downstream broadband light source and the first multiplexer/de-multiplexer; and
   the signal monitoring unit for monitoring change of a wavelength of the monitor light reflected from the remote node so as to inspect a change in wavelengths of the upstream optical signals and the downstream optical signals and controlling the first multiplexer/de-multiplexer according to an inspection result.

2. The wavelength-division multiplexing passive optical network as claimed in claim 1, wherein the central office further comprises:
   a first optical splitter disposed on the first optical path and linked with both the upstream broadbhnd light source and the downstream broadband light source, thereby outputting the downstream light to the first multiplexer/demultiplexer and outputting the upstream light to the remote node;
   a second optical splitter disposed between the first optical splitter and the remote node, thereby outputting the upstream light and multiplexed downstream optical signals to the remote node and outputting the monitor light reflected from the remote node to the signal monitoring unit; and a plurality of first wavelength selection couplers for linking the corresponding downstream light sources and the corresponding upstream optical detectors with the first multiplexer/de-multiplexer.

3. The wavelength-division multiplexing passive optical network as claimed in claim 1, wherein the signal monitoring unit comprises:

a wavelength-division multiplexer for dividing multiplexed upstream optical signals and monitor light received from the second optical splitter according to corresponding paths and outputting the multiplexed upstream optical signals;

a first optical receiver for converting the monitor light received from the wavelength-division multiplexer into a first electrical signal;

a second optical receiver for converting the upstream optical signal received from the wavelength-division multiplexer into a second electrical signal;

a control unit for determining if the first optical path and the second optical path are abnormal based on an intensity change and a received state of the first and second electrical signals and generating control signals used for compensating the first and second electrical signals;

a first wavelength controlling unit for controlling the first multiplexer/de-multiplexer according to the control signal; and a second wavelength controlling unit for controlling the first wavelength selection reflection filter according to the control signal.

4. The wavelength-division multiplexing passive optical network as claimed in claim 1, wherein the remote node comprises:

a second multiplex/de-multiplexer for de-multiplexing the upstream light and the multiplexed downstream optical signals to be output to the corresponding subscriber units and multiplexing upstream optical signals received from the subscriber units so as to output the upstream optical signals to the central office; and a second wavelength selection reflection filter for reflecting the monitor light (received from the central office) to the central office, the second wavelength selection reflection filter being positioned between the second multiplexer/de-multiplexer and the central office.

5. The wavelength-division multiplexing passive optical network as claimed in claim 1, wherein each of the subscriber units comprises:

a downstream optical detector for detecting a corresponding downstream optical signal;

an upstream light source for generating a wavelength-locked upstream optical signal; and a wavelength selection coupler for linking the downstream optical detector and the upstream light source with the second optical path.

6. A wavelength-division multiplexing passive optical network (WDM PON) comprising:

a central office for generating a monitor light and multiplexed downstream optical signals to be output and detecting upstream optical signals, the central office including a signal monitoring unit monitoring based on a fed-back monitor light if wavelengths of the upstream optical signals and wavelengths of the downstream optical signals change:

a plurality of subscriber units for detecting corresponding downstream optical signals and generating upstream optical signals:

a remote node for reflecting the monitor light to the central office, de-multiplexing multiplexed downstream optical signals so as to output the downstream optical signals to the corresponding subscriber units, and multiplexing the upstream optical signals so as to output the upstream optical signals to the central office:

a first optical path for linking the central office with the remote node; and a plurality of second optical paths for linking the remote node with the subscriber units, respectively, wherein the central office comprises:

a downstream broadband light source for generating downstream light with a broad wavelength band:

a upstream light source for generating upstream light having a wavelength band different from a wavelength band of the downstream light;

a plurality of downstream light sources for generating downstream optical signals having wavelengths locked by the downstream light;

a plurality of upstream optical detectors for detecting upstream optical signals;

a first multiplexer/de-multiplexer for multiplexing the downstream optical signals to be output, de-multiplexing multiplexed upstream optical signals to be output to the corresponding upstream optical detectors, and dividing the downstream light into a plurality of downstream channels to be output to the corresponding downstream light sources;

the signal monitoring unit for generating the monitor light and monitoring change of a wavelength of the monitor light reflected from the remote node so as to inspect change of wavelengths of the upstream optical signals and the downstream optical signals;

a first wavelength selection reflection filter for selectively reflecting only monitor light, the first wavelength selection reflection filter being positioned between the upstream broadband light source and the first multiplexer/de-multiplexer;

an optical splitter positioned on the first optical path and linked with both the upstream broadband light source and the downstream broadband light source, thereby outputting the downstream light to the first wavelength selection reflection filter and outputting the upstream light to the remote node; and an optical signal circulating unit for outputting multiplexed light and the upstream light to the remote node, outputting multiplexed upstream optical signals to the first multiplexer/de-multiplexer, and inputting/outputting the monitor light.

7. The wavelength-division multiplexing passive optical network as claimed in claim 6, wherein the optical signal circulating unit comprises:

at least two wavelength-division multiplexers being opposite to each other on the first optical path: and a circulator for linking the signal monitoring unit with the wavelength-division multiplexers, outputting the monitor light generated from the signal monitoring unit to the remote node through the corresponding wavelength-division multiplexer, and outputting a portion of the multiplexed upstream optical signals and the monitor light input through the corresponding wavelength-division multiplexer to the signal monitoring unit.

8. The wavelength-division multiplexing passive optical network as claimed in claim 6, wherein the signal monitoring unit comprises:
- a spontaneous emission light source for generating monitor light and outputting the generated monitor light to the optical signal circulating unit;
- an optical receiver for converting the monitor light received from the corresponding wave length-division multiplexer into an electrical signal;
- a control unit for determining if the first optical path and the second optical path are abnormal based on an intensity change and a received state of the electrical signal and generating control signals used for compensating the electrical signal;
- a first wavelength controlling unit for controlling the first multiplexer/de-multiplexer according to the corresponding control signal generated from the control unit; and
- a second wavelength controlling unit for controlling the first wavelength selection reflection filter according to the corresponding control signal generated from the control unit.

9. The wavelength-division multiplexing passive optical network as claimed in claim 6, wherein the spontaneous emission light source generates spontaneous emission light having a broad wavelength band including a wavelength of the monitor light.

10. The wavelength-division multiplexing passive optical network as claimed in claim 6, wherein the central office further comprises a plurality of first wavelength selection couplers for linking the corresponding downstream light sources and the corresponding upstream optical detectors with the first multiplexer/de-multiplexer.

11. The wavelength-division multiplexing passive optical network as claimed in claim 1, wherein the remote node comprises:
- a second multiplexer/de-multiplexer for multiplexing the upstream light and the multiplexed downstream optical signals to be output to the corresponding subscriber units; and
- a second wavelength selection reflection filter positioned between the second multiplexer/de-multiplexer and the subscriber units on the second optical path, thereby reflecting monitor light having a corresponding wavelength to the second multiplexer/de-multiplexer.

* * * * *